United States Patent
Yu et al.

(10) Patent No.: US 11,984,800 B2
(45) Date of Patent: May 14, 2024

(54) POWER SUPPLY SYSTEM AND CONTROL METHOD FOR POWER SUPPLY SYSTEM

(71) Applicant: Huawei Digital Power Technologies Co., Ltd., Shenzhen (CN)

(72) Inventors: Xinyu Yu, Shanghai (CN); Kai Xin, Shanghai (CN); Junjie Li, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 176 days.

(21) Appl. No.: 17/693,221

(22) Filed: Mar. 11, 2022

(65) Prior Publication Data

US 2022/0294336 A1 Sep. 15, 2022

(30) Foreign Application Priority Data

Mar. 12, 2021 (CN) .......................... 202110269739.2

(51) Int. Cl.
*H02M 1/32* (2007.01)
*H02M 7/44* (2006.01)
*H02J 3/38* (2006.01)

(52) U.S. Cl.
CPC .............. *H02M 1/32* (2013.01); *H02M 7/44* (2013.01); *H02J 3/381* (2013.01); *H02J 2300/24* (2020.01)

(58) Field of Classification Search
CPC ......... H02J 3/381; H02J 2300/24; H02M 1/32
See application file for complete search history.

(56) References Cited

U.S. PATENT DOCUMENTS

2012/0155140 A1 6/2012 Chen et al.
2015/0349640 A1* 12/2015 Ito ....................... H02M 3/1588
323/271
2015/0372481 A1* 12/2015 Roesner .................. H02J 9/062
361/18

FOREIGN PATENT DOCUMENTS

| CN | 203387430 U | * | 1/2014 |
| CN | 205429756 U | * | 8/2016 |
| CN | 106410854 A | | 2/2017 |
| EP | 2552007 B1 | | 4/2020 |

* cited by examiner

*Primary Examiner* — Harry R Behm
(74) *Attorney, Agent, or Firm* — Leydig, Voit & Mayer, Ltd.

(57) ABSTRACT

A power supply system for controlling the power supply system includes a direct current voltage conversion apparatus, an inverter, and a diode. The direct current voltage conversion apparatus includes a controller and a direct current voltage conversion circuit. The controller is configured to: control the output voltage of the direct current voltage conversion circuit, so that the diode is in a conducted state; detect a voltage on the direct current bus; and determine, based on the voltage on the direct current bus, whether high voltage ride-through occurs in the power supply system. According to the power supply system and the method for controlling the power supply system provided in this application, high voltage ride-through can be quickly detected while fault isolation is implemented, thereby improving efficiency of detecting high voltage ride-through.

15 Claims, 8 Drawing Sheets

POWER SUPPLY SYSTEM AND CONTROL METHOD FOR POWER SUPPLY SYSTEM

CROSS-REFERENCE TO RELATED APPLICATION

This application claims priority to Chinese Patent Application No. 202110269739.2, filed on Mar. 12, 2021, which is hereby incorporated by reference in its entirety.

TECHNICAL FIELD

This application relates to the field of circuit technologies, and more specifically, to a power supply system and a control method for the power supply system.

BACKGROUND

High voltage ride-through (HVRT) is a capability to ensure continuous operation of a photovoltaic power station without disconnecting from a grid in a specific range of voltage increase and time interval when a power system accident causes a voltage at a grid connection point of the power station to rise. During high voltage ride-through, a voltage on an alternating current power grid side rapidly rises, and therefore, a voltage on a direct current bus synchronously increases due to restriction of a pulse width modulation (PWM) ratio by a control loop of an inverter circuit. In this case, at the beginning of a fault process, a voltage conversion circuit (for example, a boost circuit) has not received information (for example, a voltage of a power signal between the alternating current power grid and the inverter circuit) about a fault on the power grid side, and control of a power system is in a maximum power point tracking (MPPT) normal operation state. However, before the voltage conversion circuit receives the information about the fault on the power grid side and completes a control process of the voltage on the direct current bus based on the information about the fault on the power grid side, a voltage on a direct current bus on the voltage conversion circuit side cannot keep up with increase of a voltage on a direct current bus on the inverter circuit side. In this case, power on a direct current side cannot be smoothly delivered and the power cannot be controlled.

In an existing technology, a diode is connected in series to the direct current bus, the diode is conducted (turned on) when the voltage conversion circuit outputs electric energy, and is cut off when the voltage conversion circuit receives electric energy. The diode can reversely cut off quickly to achieve fault isolation when high voltage ride-through occurs. However, after that, the voltage conversion circuit cannot accurately detect an inverter bus, and therefore cannot quickly determine occurrence of high voltage ride-through.

Therefore, a power supply system and a control method for the power supply system are urgently needed, to quickly implement detection of high voltage ride-through while implementing fault isolation, thereby improving efficiency of detecting high voltage ride-through.

SUMMARY

This application provides a power supply system and a control method for the power supply system, to quickly implement detection of high voltage ride-through while implementing fault isolation, thereby improving efficiency of detecting high voltage ride-through.

According to a first aspect, a power supply system is provided. The system includes: a direct current voltage conversion apparatus, including a controller and a direct current voltage conversion circuit, where the controller is configured to control the direct current voltage conversion circuit to receive electric energy output by a power generation module, and output a voltage to an inverter through a direct current bus after performing direct current conversion; the inverter, configured to receive the output voltage of the direct current voltage conversion circuit through the direct current bus, and supply power to a power grid after converting direct current power into alternating current power; and a diode connected in series to the direct current bus, where the diode is conducted when the direct current voltage conversion circuit outputs electric energy, and is cut off when the direct current voltage conversion circuit receives electric energy. The controller is further configured to: control the output voltage of the direct current voltage conversion circuit, so that the diode is in a conducted state; detect a voltage on the direct current bus when the diode is in the conducted state; and determine, based on the voltage on the direct current bus, whether high voltage ride-through occurs in the power supply system.

According to this embodiment of this application, the direct current voltage conversion apparatus controls the output voltage of the direct current voltage conversion circuit, so that the diode is in the conducted state. In this way, the direct current voltage conversion apparatus can determine, based on the voltage on the direct current bus, whether high voltage ride-through occurs, quickly implement detection of high voltage ride-through while implementing fault isolation, and improve efficiency of detecting high voltage ride-through.

With reference to the first aspect, in some implementations of the first aspect, the controller is specifically configured to: determine, by monitoring a current on the direct current bus, whether the diode is cut off; and rapidly control the output voltage of the direct current voltage conversion circuit when determining the diode is cut off, so that a voltage difference between two terminals of the diode is greater than a conduction threshold of the diode.

The controller is specifically configured to monitor a current voltage on the direct current bus, and determine that high voltage ride-through occurs in the power supply system when determining that the voltage on the direct current bus is greater than or equal to a first direct current bus voltage, where the first direct current bus voltage is greater than a rated alternating current line voltage peak of the inverter.

In this way, when the diode is cut off, the direct current voltage conversion apparatus quickly recovers a diode low current conducted state, so that the direct current voltage conversion apparatus can determine, based on the voltage on the direct current bus, whether high voltage ride-through occurs in the power supply system, quickly implement detection of high voltage ride-through while implementing fault isolation, and improve efficiency of detecting high voltage ride-through.

With reference to the first aspect, in some other implementations of the first aspect, the controller is further configured to control output power of the direct current voltage conversion circuit to be first power when determining that high voltage ride-through occurs in the power supply system, where a deviation between the first power and output power of the direct current voltage conversion circuit before high voltage ride-through occurs in the power supply system is less than a first power deviation threshold.

The controller is specifically configured to: control the output voltage and/or an output current of the direct current voltage conversion circuit when determining that high voltage ride-through occurs in the power supply system, so that the output power of the direct current voltage conversion circuit is the first power.

According to this embodiment of this application, when determining that high voltage ride-through occurs in the power supply system, the direct current voltage conversion apparatus controls a deviation between the output power of the direct current voltage conversion circuit and the output power before high voltage ride-through occurs in the power supply system to be less than the first power deviation threshold. This avoids a problem that active power imbalance may exist in an alternating current power grid during high voltage ride-through, can meet a technical requirement that active power output during a power grid fault is unchanged from active power output before the power grid fault, and improve stability of the alternating current power grid.

According to a second aspect, a power supply system is provided. The system includes: a direct current voltage conversion apparatus, including a first controller and a direct current voltage conversion circuit, where the first controller is configured to control the direct current voltage conversion circuit to receive electric energy output by a power generation module, and output a voltage to an inverter through a direct current bus after performing direct current conversion; the inverter, including a second controller and an inverter circuit, where the second controller is configured to control the inverter circuit to receive the output voltage of the direct current voltage conversion circuit through the direct current bus, and supply power to a power grid after converting direct current power into alternating current power; a diode connected in series to the direct current bus, where the diode is conducted when the direct current voltage conversion circuit outputs electric energy, and is cut off when the direct current voltage conversion circuit receives electric energy; and a first circuit, where the first circuit is connected in parallel with the diode, and a current when the first circuit is conducted is less than a preset first current value. The second controller is further configured to control the first circuit to be conducted when determining that a high voltage fault occurs in the power grid, and control the first circuit to be turned off when determining that no high voltage fault occurs in the power grid. The first controller is further configured to detect a voltage on the direct current bus, and determine, based on the voltage on the direct current bus, whether high voltage ride-through occurs in the power supply system.

According to this embodiment of this application, the inverter controls the first circuit to be conducted when a high voltage fault occurs in the power grid and to be turned off when no high voltage fault occurs, so that the direct current voltage conversion apparatus can determine, based on the voltage on the direct current bus, whether high voltage ride-through occurs in the power supply system, to quickly implement detection of high voltage ride-through while implementing fault isolation, and improve efficiency of detecting high voltage ride-through.

With reference to the second aspect, in some implementations of the second aspect, the first controller is specifically configured to monitor a current voltage on the direct current bus, and determine that high voltage ride-through occurs in the power supply system when determining that the voltage on the direct current bus is greater than or equal to a first direct current bus voltage, where the first direct current bus voltage is greater than a rated alternating current line voltage peak of the inverter.

In this way, the direct current voltage conversion apparatus may determine, based on whether the voltage on the direct current bus is greater than a preset first direct current bus voltage, whether high voltage ride-through occurs in the power supply system, to quickly implement detection of high voltage ride-through, and improve efficiency of detecting high voltage ride-through.

With reference to the second aspect, in some other implementations of the second aspect, the first controller is further configured to control output power of the direct current voltage conversion circuit to be first power when determining that high voltage ride-through occurs in the power supply system, where a deviation between the first power and output power of the direct current voltage conversion circuit before high voltage ride-through occurs in the power supply system is less than a first power deviation threshold.

The first controller is specifically configured to: control the output voltage and/or an output current of the direct current voltage conversion circuit when determining that high voltage ride-through occurs in the power supply system, so that the output power of the direct current voltage conversion circuit is the first power.

According to this embodiment of this application, when determining that high voltage ride-through occurs in the power supply system, the direct current voltage conversion apparatus controls a deviation between the output power of the direct current voltage conversion circuit and the output power before high voltage ride-through occurs in the power supply system to be less than the first power deviation threshold. This avoids a problem that active power imbalance may exist in an alternating current power grid during high voltage ride-through, can meet a technical requirement that active power output during a power grid fault is unchanged from active power output before the power grid fault, and improve stability of the alternating current power grid.

Optionally, the first circuit includes a reverse prevention insulated gate bipolar transistor (IGBT).

According to a third aspect, a method for controlling a power supply system is provided, where the method is performed by the power supply system. The power supply system includes: a direct current voltage conversion apparatus, including a controller and a direct current voltage conversion circuit, where the controller is configured to control the direct current voltage conversion circuit to receive electric energy output by a power generation module, and output a voltage to an inverter through a direct current bus after performing direct current conversion; the inverter, configured to receive the output voltage of the direct current voltage conversion circuit through the direct current bus, and supply power to a power grid after converting direct current power into alternating current power; and a diode connected in series to the direct current bus, where the diode is conducted when the direct current voltage conversion circuit outputs electric energy, and is cut off when the direct current voltage conversion circuit receives electric energy.

The method includes: The controller controls the output voltage of the direct current voltage conversion circuit, so that the diode is in a conducted state; and the controller detects the voltage on the direct current bus when the diode is in the conducted state, and determines, based on the voltage on the direct current bus, whether high voltage ride-through occurs in the power supply system.

According to this embodiment of this application, the direct current voltage conversion apparatus controls the output voltage of the direct current voltage conversion circuit, so that the diode is in the conducted state. In this way, the direct current voltage conversion apparatus can determine, based on the voltage on the direct current bus, whether high voltage ride-through occurs, quickly implement detection of high voltage ride-through while implementing fault isolation, and improve efficiency of detecting high voltage ride-through.

With reference to the third aspect, in some implementations of the third aspect, that the controller controls the output voltage of the direct current voltage conversion circuit, so that the diode is in a conducted state includes: The controller determines that the diode is cut off by monitoring a current on the direct current bus, and controls the output voltage of the direct current voltage conversion circuit when the diode is cut off, so that a voltage difference between two terminals of the diode is greater than a conduction threshold of the diode.

That the controller detects the voltage on the direct current bus, and determines, based on the voltage on the direct current bus, whether high voltage ride-through occurs in the power supply system includes: The controller monitors a current voltage on the direct current bus, and determines that high voltage ride-through occurs in the power supply system when determining that the voltage on the direct current bus is greater than or equal to a first direct current bus voltage, where the first direct current bus voltage is greater than a rated alternating current line voltage peak of the inverter.

In this way, when the diode is cut off, the direct current voltage conversion apparatus quickly recovers a diode low current conducted state, so that the direct current voltage conversion apparatus can determine, based on the voltage on the direct current bus, whether high voltage ride-through occurs in the power supply system, quickly implement detection of high voltage ride-through while implementing fault isolation, and improve efficiency of detecting high voltage ride-through.

With reference to the third aspect, in some other implementations of the third aspect, the method further includes: The controller controls output power of the direct current voltage conversion circuit to be first power when determining that high voltage ride-through occurs in the power supply system, where a deviation between the first power and output power of the direct current voltage conversion circuit before high voltage ride-through occurs in the power supply system is less than a first power deviation threshold.

That the controller controls output power of the direct current voltage conversion circuit to be first power when determining that high voltage ride-through occurs in the power supply system includes: When determining that high voltage ride-through occurs in the power supply system, the controller controls the output voltage and/or an output current of the direct current voltage conversion circuit, so that the output power of the direct current voltage conversion circuit is the first power.

According to this embodiment of this application, when determining that high voltage ride-through occurs in the power supply system, the direct current voltage conversion apparatus controls a deviation between the output power of the direct current voltage conversion circuit and the output power before high voltage ride-through occurs in the power supply system to be less than the first power deviation threshold. This avoids a problem that active power imbalance may exist in an alternating current power grid during high voltage ride-through, can meet a technical requirement that active power output during a power grid fault is unchanged from active power output before the power grid fault, and improve stability of the alternating current power grid.

According to a fourth aspect, a control method for a power supply system is provided, where the method is performed by the power supply system. The power supply system includes: a direct current voltage conversion apparatus, including a first controller and a direct current voltage conversion circuit, where the first controller is configured to control the direct current voltage conversion circuit to receive electric energy output by a power generation module, and output a voltage to an inverter through a direct current bus after performing direct current conversion; the inverter, including a second controller and an inverter circuit, where the second controller is configured to control the inverter circuit to receive the output voltage of the direct current voltage conversion circuit through the direct current bus, and supply power to a power grid after converting direct current power into alternating current power; a diode connected in series to the direct current bus, where the diode is conducted when the direct current voltage conversion circuit outputs electric energy, and is cut off when the direct current voltage conversion circuit receives electric energy; and a first circuit, where the first circuit is connected in parallel with the diode, and a current when the first circuit is conducted is less than a preset first current value.

The method includes: The second controller controls the first circuit to be conducted when determining that a high voltage fault occurs in the power grid, and controls the first circuit to be turned off when determining that no high voltage fault occurs in the power grid; and the first controller detects a voltage on the direct current bus, and determines, based on the voltage on the direct current bus, whether high voltage ride-through occurs in the power supply system.

According to this embodiment of this application, the inverter controls the first circuit to be conducted when a high voltage fault occurs in the power grid and to be turned off when no high voltage fault occurs, so that the direct current voltage conversion apparatus can determine, based on the voltage on the direct current bus, whether high voltage ride-through occurs in the power supply system, to quickly implement detection of high voltage ride-through while implementing fault isolation, and improve efficiency of detecting high voltage ride-through.

With reference to the fourth aspect, in some implementations of the fourth aspect, that the first controller detects a voltage on the direct current bus, and determines, based on the voltage on the direct current bus, whether high voltage ride-through occurs in the power supply system includes: The first controller monitors a current voltage on the direct current bus, and determines that high voltage ride-through occurs in the power supply system when determining that the voltage on the direct current bus is greater than or equal to a first direct current bus voltage, where the first direct current bus voltage is greater than a rated alternating current line voltage peak of the inverter.

In this way, the direct current voltage conversion apparatus may determine, based on whether the voltage on the direct current bus is greater than or equal to a preset first direct current bus voltage, whether high voltage ride-through occurs in the power supply system, to quickly implement detection of high voltage ride-through, and improve efficiency of detecting high voltage ride-through.

With reference to the fourth aspect, in some other implementations of the fourth aspect, the method further includes:

The first controller controls output power of the direct current voltage conversion circuit to be first power when determining that high voltage ride-through occurs in the power supply system, where a deviation between the first power and output power of the direct current voltage conversion circuit before high voltage ride-through occurs in the power supply system is less than a first power deviation threshold.

That the first controller controls output power of the direct current voltage conversion circuit to be first power when determining that high voltage ride-through occurs in the power supply system includes: When determining that high voltage ride-through occurs in the power supply system, the first controller controls the output voltage and/or an output current of the direct current voltage conversion circuit, so that the output power of the direct current voltage conversion circuit is the first power.

According to this embodiment of this application, when determining that high voltage ride-through occurs in the power supply system, the direct current voltage conversion apparatus controls a deviation between the output power of the direct current voltage conversion circuit and the output power before high voltage ride-through occurs in the power supply system to be less than the first power deviation threshold. This avoids a problem that active power imbalance may exist in an alternating current power grid during high voltage ride-through, can meet a technical requirement that active power output during a power grid fault is unchanged from active power output before the power grid fault, and improve stability of the alternating current power grid.

Optionally, the first circuit includes a reverse prevention insulated gate bipolar transistor (IGBT).

DESCRIPTION OF EMBODIMENTS

The following describes technical solutions of this application with reference to accompanying drawings.

Figure 1:
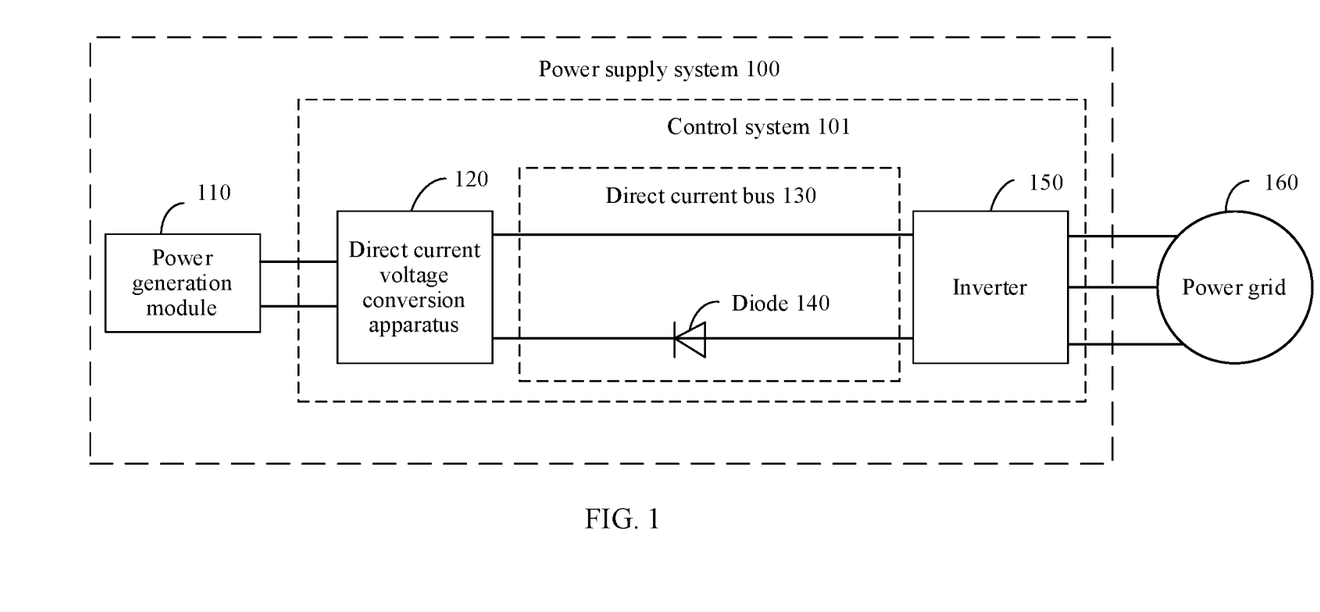
FIG. 1 is a schematic diagram of a structure of a power supply system applicable to an embodiment of this application.
Figure 2:
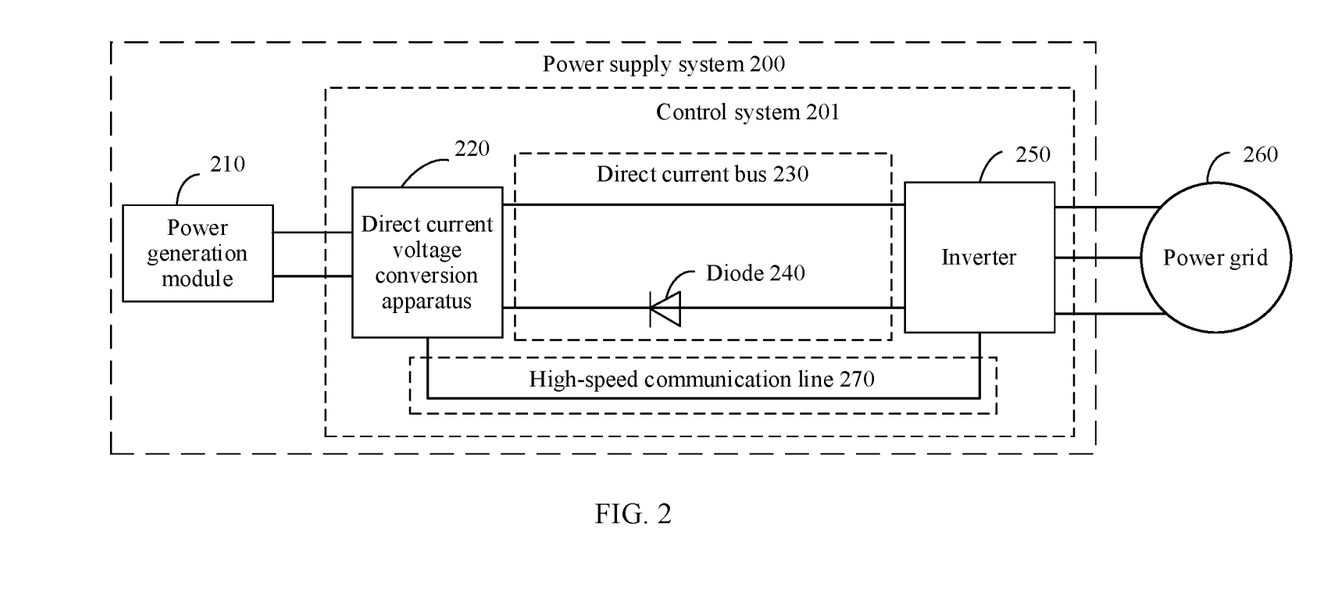
FIG. 2 is a schematic diagram of an existing structure applicable to a power supply system.

For ease of understanding the embodiments of this application, the following describes application scenarios of the embodiments of this application with reference to FIG. 1 and FIG. 2.

FIG. 1 is a schematic diagram of a structure of a power supply system applicable to an embodiment of this application. As shown in FIG. 1, a power supply system 100 may generate alternating current power and provide the generated alternating current power to a power grid 160. The power supply system 100 may include a power generation module 110 and a control system 101. The control system 101 includes a direct current voltage conversion apparatus 120, a diode 140, and an inverter 150. The power generation module 110 may output generated electric energy to the direct current voltage conversion apparatus 120. The direct current voltage conversion apparatus 120 may receive the electric energy output by the power generation module 110, and output electric energy to the inverter 150 through a direct current bus 130 after performing direct current conversion. The inverter 150 may receive the electric energy from the direct current voltage conversion apparatus 120, and supply power to the power grid after converting direct current power into alternating current power. The electric energy of the power generation module 110 is output to the direct current bus 130 after direct current voltage conversion by the direct current voltage conversion apparatus 120. The direct current bus 130 is connected to the direct current voltage conversion apparatus 120 and the inverter 150, and power of the direct current voltage conversion apparatus 120 and the inverter 150 is transmitted through the direct current bus 130. The inverter 150 may monitor a voltage of the power grid, and when determining, based on the voltage of the power grid, that a high voltage fault occurs in the power grid, increase a voltage on the direct current bus 130 to a specific threshold. The direct current voltage conversion apparatus 120 detects the voltage on the direct current bus, and controls the voltage on the bus to a higher threshold when determining, based on the voltage on the bus, that high voltage ride-through occurs, to ensure implementation of high voltage ride-through.

However, in actual application, to avoid fault diffusion caused by a direct current side short circuit, the diode 140 is usually connected in series to the direct current bus 130. The diode 140 is conducted when the direct current voltage conversion apparatus outputs electric energy, and is cut off when the direct current voltage conversion circuit receives electric energy, so as to implement fault isolation. When a high voltage fault occurs in the power grid, after the voltage on the direct current bus 130 on the inverter 150 side increases, the diode 140 is quickly reversely cut off. As a result, the direct current voltage conversion apparatus 120 cannot accurately detect an inverter bus. Therefore, whether high voltage ride-through occurs cannot be quickly determined, and output power cannot be accurately controlled.

It should be understood that a circuit connection relationship is not limited in this embodiment of this application. In actual application, components in FIG. 1 may be further connected to another device therebetween. For example, an output terminal of the inverter 150 may be directly connected to the power grid 160, or may be connected to the power grid 160 by using a transformer. For another example, the power generation module 110 has only a photovoltaic (PV) array input, and may also have another energy source, for example, a battery.

It should also be understood that in this application, a topology of the direct current voltage conversion apparatus 120 may be a buck converter, a boost converter, a buck-boost converter, or a boost-buck converter, which may be isolated or non-isolated. A topology structure of the direct current voltage conversion apparatus 120 or the inverter 150 is not limited in this application. For example, the direct current voltage conversion apparatus 120 may be referred to as a direct current to direct current (DC/DC) converter. The inverter 150 may also be referred to as a power conversion system (PCS) or a direct current to alternating current (DC/AC) converter.

An existing high voltage ride-through technology applicable to a power supply system is to notify a direct current voltage conversion apparatus through a long-distance high-speed communication line that high voltage ride-through occurs. As shown in FIG. 2, a power supply system 200 includes a power generation module 210 and a control system 201. In the control system 201, an inverter 250 is connected to a direct current voltage conversion apparatus 220 through a high-speed communication line 270. Other structures are the same as those of the power supply system 100 shown in FIG. 1. Details are not described herein again.

The inverter 250 monitors a voltage of a power grid 260, and when determining, based on the voltage of the power grid, that a high voltage fault occurs in the power grid 260, the inverter 250 notifies the direct current voltage conversion apparatus 220 of the high voltage fault through the high-speed communication line 270, and the direct current voltage conversion apparatus 220 increases a voltage on a direct current bus 230 after learning that the high voltage fault occurs, to ensure smooth output of power on a direct current side, and implement high voltage ride-through.

However, in actual application, when a voltage change of an alternating current power grid is detected, the voltage is transmitted to a voltage conversion circuit, and control of the voltage conversion circuit is greatly delayed. For example, during a change process of output power of the inverter 250, a required voltage on a bus changes with the voltage of the power grid and the output power. In this case, the direct current voltage conversion apparatus 220 cannot adjust the voltage on the direct current bus 230 in a timely manner, which may cause a large power fluctuation. In addition, when the output power rises, a system output power response speed depends on a direct current bus voltage loop control parameter of the direct current voltage conversion apparatus 220, which affects a power control response speed. In addition, this method requires an additional high-speed communication line, which brings additional design costs and maintenance costs, and is unfavorable for large-scale application.

Based on the foregoing reason, this application provides a power supply system, which does not depend on the high-speed communication line, and can quickly implement detection of high voltage ride-through while implementing fault isolation, and improve efficiency of detecting high voltage ride-through.

Figure 3:
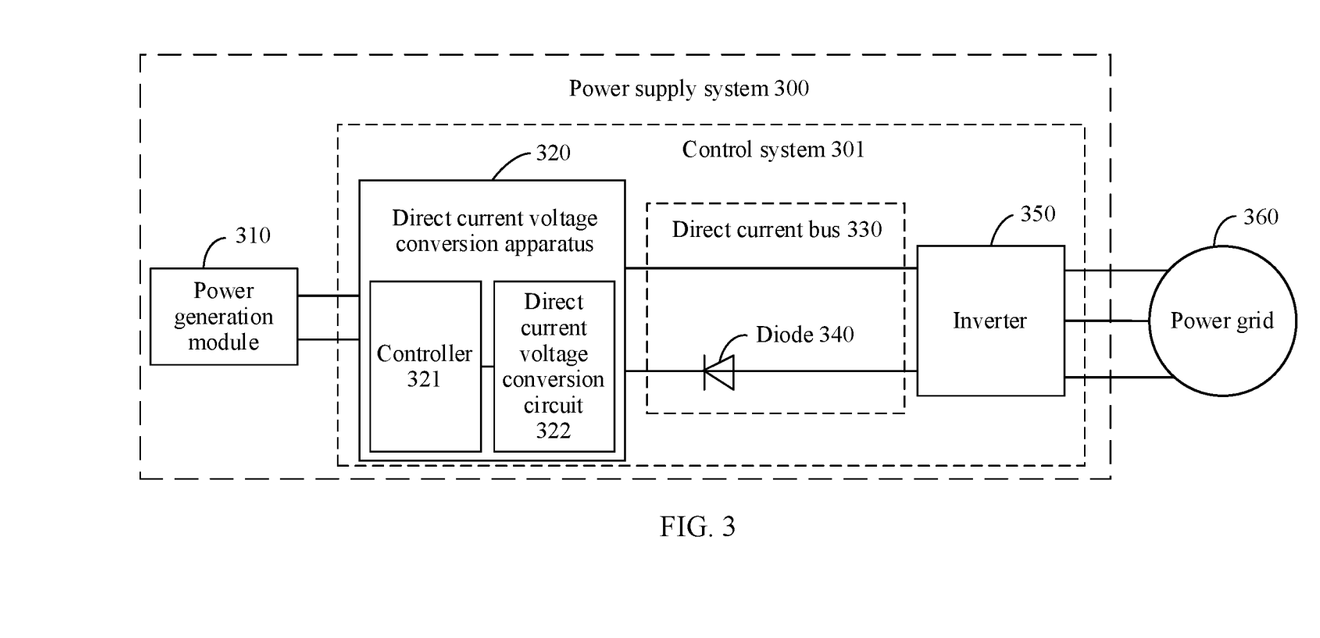
FIG. 3 is a schematic diagram of a structure of a power supply system according to an embodiment of this application.

FIG. 3 is a schematic diagram of a structure of a power supply system according to an embodiment of this application. As shown in FIG. 3, a power supply system 300 includes a power generation module 310 and a control system 301. In the control system 301, a direct current voltage conversion apparatus 320 includes a controller 321 and a direct current voltage conversion circuit 322. Other structures are the same as those of the power supply system 100 shown in FIG. 1. Details are not described herein again.

In this embodiment of this application, the controller 321 may control the direct current voltage conversion circuit 322 to receive electric energy output by the power generation module 310, and output a voltage to an inverter 350 through a direct current bus 330 after performing direct current conversion. In addition, the controller 321 may further control the output voltage of the direct current voltage conversion circuit 322, so that a diode 340 is in a conducted state. When the diode 340 is in the conducted state, the controller 321 may detect, with reference to the conventional technology, a voltage on the direct current bus 330, and determine, based on the voltage on the direct current bus 330, whether high voltage ride-through occurs in the power supply system 300.

Specifically, the controller 321 may monitor a current on the direct current bus 330, and when the current on the direct current bus 330 is less than a conduction current of the diode 340, quickly control the output voltage of the direct current voltage conversion circuit 322, so that a voltage difference between two terminals of the diode 340 is greater than a conduction threshold. For example, when detecting that a high voltage fault occurs in a power grid 360, the inverter 350 increases the voltage on the direct current bus 330 to a first direct current bus voltage, where the first direct current bus voltage is greater than a rated alternating current line voltage peak of the inverter. When a voltage on a direct current bus on the inverter 350 side is greater than a voltage on a direct current bus on the direct current voltage conversion apparatus 320 side, the direct current voltage conversion circuit 322 receives electric energy. The diode 340 connected in series to the direct current bus 330 is quickly cut off because a voltage difference between a positive electrode and a negative electrode is less than a threshold voltage, so that the current on the direct current bus 330 is less than the conduction current of the diode 340. In this case, the controller 321 can quickly control the output voltage of the direct current voltage conversion circuit 322, so that the voltage difference between the two terminals of the diode 340 is greater than the conduction threshold. In this case, the controller 321 may monitor a current voltage on the direct current bus 330, and determine that high voltage ride-through occurs in the power supply system 300 when determining that the voltage on the direct current bus 330 is greater than or equal to the first direct current bus voltage. The first direct current bus voltage is greater than the rated alternating current line voltage peak of the inverter.

In this way, when the diode is cut off, the direct current voltage conversion apparatus quickly recovers a diode low current conducted state, so that the direct current voltage conversion apparatus can determine, based on the voltage on the direct current bus, whether high voltage ride-through occurs in the power supply system, quickly implement detection of high voltage ride-through while implementing fault isolation, and improve efficiency of detecting high voltage ride-through.

It should be understood that how the inverter 350 specifically determines that a high voltage fault occurs in the power grid 360 may be set based on an actual situation, or refer to the conventional technology. This is not limited in this application. For example, if the voltage of the power grid is greater than a preset voltage threshold and reaches specified time (for example, 2 ms), it is determined that the power grid encounters a high voltage fault.

In a possible implementation, the controller 321 may further control output power of the direct current voltage conversion circuit 322 when determining that high voltage ride-through occurs in the power supply system 300. For example, to improve stability of the alternating current power grid, the output power of the direct current voltage conversion circuit 322 may be controlled to be first power. A deviation between the first power and output power of the direct current voltage conversion circuit 322 before high voltage ride-through occurs in the power supply system 300 is less than a first power deviation threshold. As an example rather than a limitation, the first power may be output power of the direct current voltage conversion circuit 322 40 ms before the controller 321 detects high voltage ride-through, and the first power deviation threshold may be a preset value, for example, 10% of rated output power. That is, the controller 321 may adjust, by controlling the output voltage and/or an output current of the direct current voltage conversion circuit 322, the output power of the direct current voltage conversion circuit 322 to the output power 40 ms before high voltage ride-through is detected, where the deviation value may be 10% of the output power.

This avoids a problem that active power imbalance may exist in the alternating current power grid during high voltage ride-through, can meet a technical requirement that active power output during a power grid fault is unchanged from active power output before the power grid fault, and improve stability of the alternating current power grid.

According to this embodiment of this application, the direct current voltage conversion apparatus controls the output voltage of the direct current voltage conversion circuit, so that the diode is in the conducted state. In this way, the direct current voltage conversion apparatus can determine, based on the voltage on the direct current bus, whether high voltage ride-through occurs, quickly implement detection of high voltage ride-through while implementing fault isolation, and improve efficiency of detecting high voltage ride-through.

Figure 4:
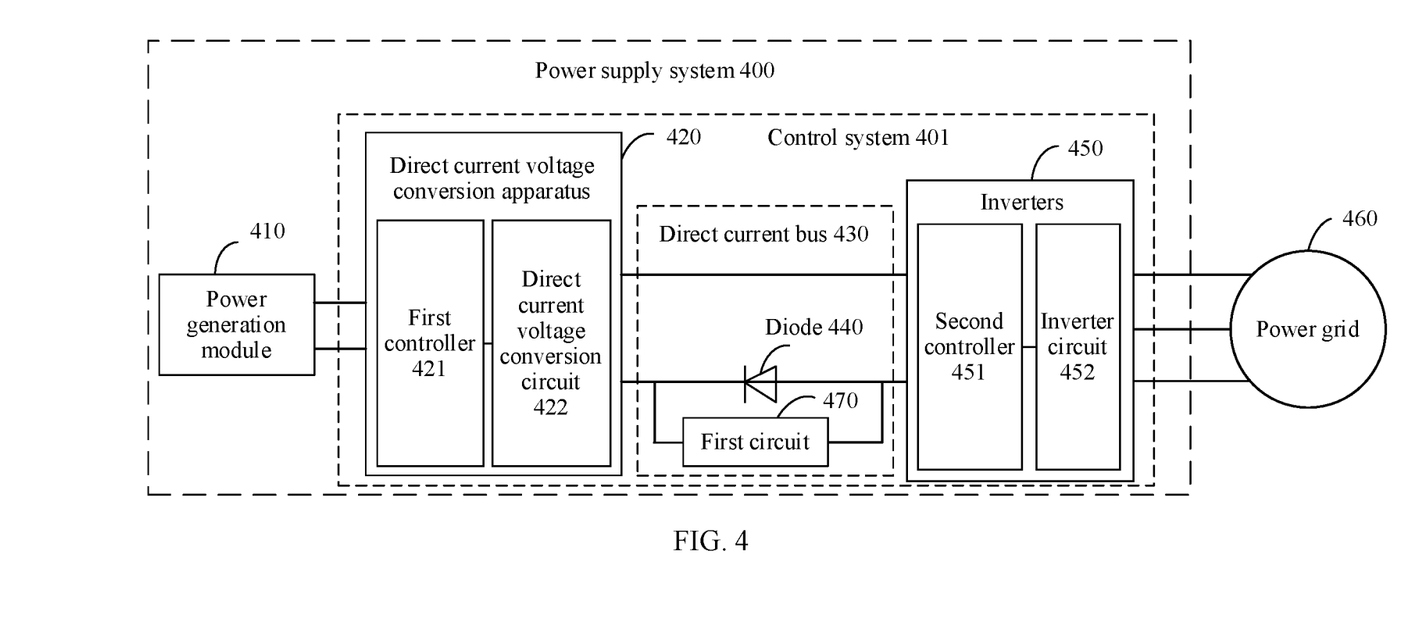
FIG. 4 is another schematic diagram of a structure of a power supply system according to an embodiment of this application.

FIG. 4 is another schematic diagram of a structure of a power supply system according to an embodiment of this application. As shown in FIG. 4, a power supply system 400 includes a power generation module 410 and a control system 401. In the control system 401, a direct current voltage conversion apparatus 420 includes a first controller 421 and a direct current voltage conversion circuit 422. An inverter 450 includes a second controller 451 and an inverter circuit 452. A first circuit 470 is connected in parallel with a diode 440, where a current of the first circuit during conduction is less than a preset first current value. Other structures are the same as those of the power supply system 100 shown in FIG. 1. Details are not described herein again.

In this embodiment of this application, the first controller 421 may control the direct current voltage conversion circuit 422 to receive electric energy output by the power generation module 410, and output a voltage to the inverter 450 through a direct current bus 430 after performing direct current conversion. The second controller 451 is configured to control the inverter circuit 452 to receive the output voltage of the direct current voltage conversion circuit 422 through the direct current bus 430, and supply power to a power grid 460 after converting direct current power into alternating current power. The second controller 451 is further configured to control the first circuit 470 to be conducted when determining that a high voltage fault occurs in the power grid 460, and control the first circuit 470 to be turned off when determining that no high voltage fault occurs in the power grid 460. The first controller 421 is further configured to: detect a voltage on the direct current bus 430, and determine, based on the voltage on the direct current bus 430, that high voltage ride-through occurs in the power supply system 400.

For example, when detecting a high voltage fault in the power grid 460, the second controller 451 in the inverter 450 increases the voltage on the direct current bus 430 to a first direct current bus voltage, where the first direct current bus voltage is greater than a rated alternating current line voltage peak of the inverter, for example, the first direct current bus voltage may be set to 1.1 times the rated alternating current line voltage peak of the inverter. When a voltage on a direct current bus on the inverter 450 side is greater than a voltage on a direct current bus on the direct current voltage conversion apparatus 420 side, the direct current voltage conversion circuit 422 receives electric energy. The diode 440 connected in series to the direct current bus 430 is quickly cut off because a voltage difference between a positive electrode and a negative electrode is less than a threshold voltage. In this case, the second controller 451 may quickly control the first circuit 470 to be conducted, and a current of the first circuit 470 when the first circuit 470 is conducted is less than a preset first current value, so that a component in the system is not destroyed due to an excessively large current when the first circuit 470 is conducted. The first current value may be determined according to practice, and as an example, the first current value is less than a rated current value of the power supply system. In this case, the first controller 421 may monitor a current voltage on the direct current bus 430, and determine that high voltage ride-through occurs in the power supply system 400 when determining that the voltage on the direct current bus 430 is greater than or equal to the first direct current bus voltage.

In this way, when detecting that a high voltage fault occurs in the power grid and raises the voltage on the bus, the inverter can control the first circuit to be conducted, so that the direct current voltage conversion apparatus can determine, based on the voltage on the direct current bus, whether high voltage ride-through occurs in the power supply system, to quickly implement detection of high voltage ride-through while implementing fault isolation, and improve efficiency of detecting high voltage ride-through.

It should be understood that how the inverter 450 specifically determines that a high voltage fault occurs in the power grid 460 may be set based on an actual situation, or refer to the conventional technology. This is not limited in this application. For example, if the voltage of the power grid is greater than a preset voltage threshold and reaches specified time (for example, 2 ms), it is determined that a high voltage fault occurs in the power grid.

In a possible implementation, the first controller 421 may further control output power of the direct current voltage conversion circuit 422 when determining that high voltage ride-through occurs in the power supply system 400. For example, to improve stability of the alternating current power grid, the output power of the direct current voltage conversion circuit 422 may be controlled to be first power. A deviation between the first power and output power of the direct current voltage conversion circuit 422 before high voltage ride-through occurs in the power supply system 400 is less than a first power deviation threshold. As an example rather than a limitation, the first power may be output power of the direct current voltage conversion circuit 422 40 ms before the first controller 421 detects high voltage ride-through, and the first power deviation threshold may be a preset value, for example, 10% of rated output power. That is, the first controller 421 may adjust, by controlling the output voltage and/or an output current of the direct current voltage conversion circuit 422, the output power of the direct current voltage conversion circuit 422 to the output power 40 ms before high voltage ride-through is detected, where the deviation value may be 10% of the output power.

This avoids a problem that active power imbalance may exist in the alternating current power grid during high voltage ride-through, can meet a technical requirement that active power output during a power grid fault is unchanged from active power output before the power grid fault, and improve stability of the alternating current power grid.

According to this embodiment of this application, the inverter controls the first circuit to be conducted when a high voltage fault occurs in the power grid and to be turned off when no high voltage fault occurs, so that the direct current voltage conversion apparatus can determine, based on the voltage on the direct current bus, whether high voltage ride-through occurs in the power supply system, to quickly implement detection of high voltage ride-through while implementing fault isolation, and improve efficiency of detecting high voltage ride-through.

Figure 5:
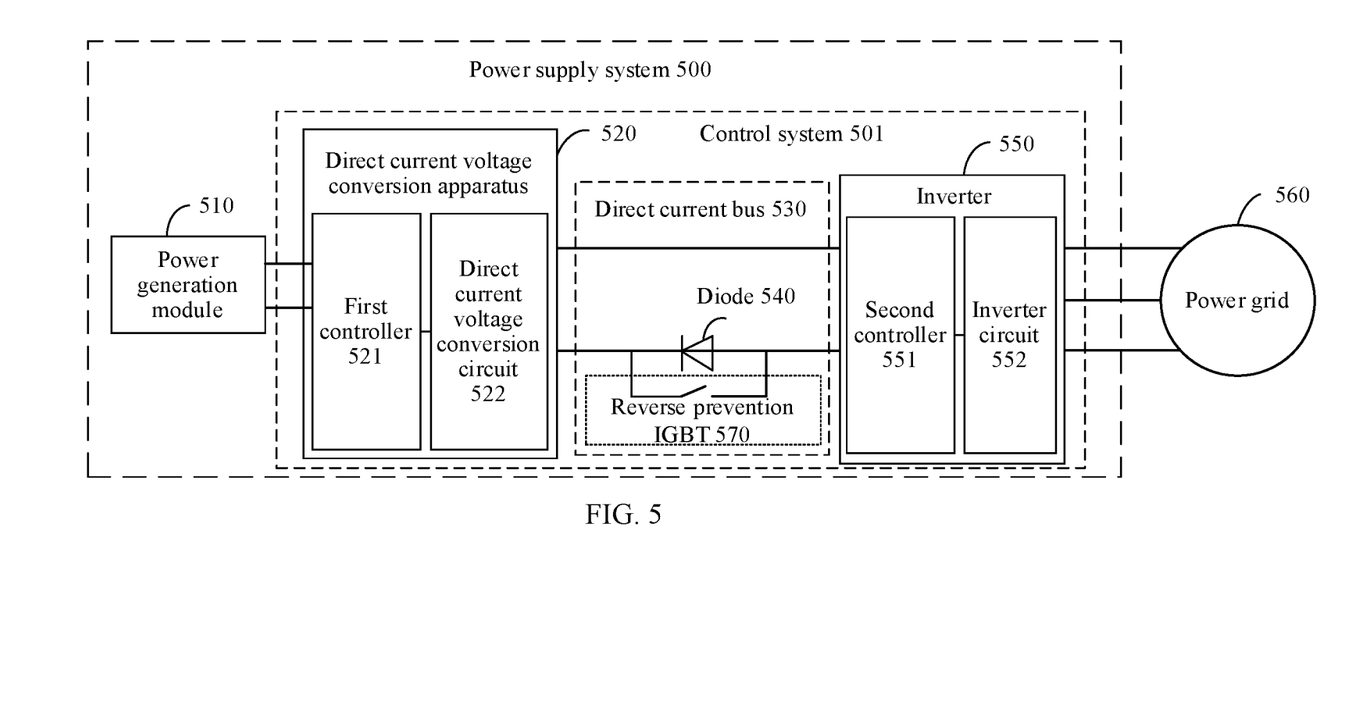
FIG. 5 is a still another schematic diagram of a structure of a power supply system according to an embodiment of this application.

In this embodiment of this application, the first circuit may have a plurality of structures. For example, FIG. 5 shows a possible structure of the first circuit, that is, the first circuit may be a reverse prevention insulated gate bipolar transistor IGBT 570. In a preferred implementation, the reverse prevention IGBT 570 may implement all functions of the first circuit described in FIG. 4. For example, when a diode 540 is cut off, a second controller 551 controls the diode 540 to be conducted, and a current when the diode 540 is conducted is less than a preset first current value, so that a component in the system is not destroyed due to an excessively large current. Therefore, the direct current voltage conversion apparatus can determine, based on the voltage on the direct current bus, whether high voltage ride-through occurs in the power supply system, quickly implement detection of high voltage ride-through while implementing fault isolation, and improve efficiency of detecting high voltage ride-through. Certainly, the first circuit may alternatively be another circuit that can make a conduction current less than the preset first current value. This is not limited in this application.

Figure 6:
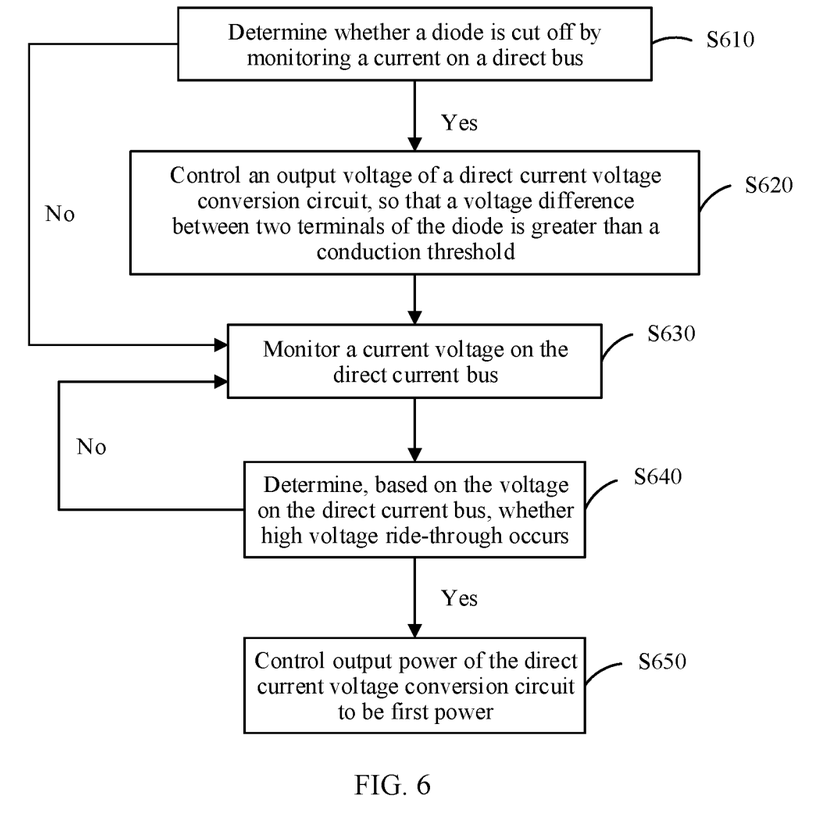
FIG. 6 is a schematic diagram of a control method for a power supply system according to an embodiment of this application.

FIG. 6 is a schematic diagram of a control method for a power supply system according to an embodiment of this application. The control method may be performed by the controller 321 in the power supply system 300 shown in FIG. 3.

S610: Determine whether a diode is cut off by monitoring a current on a direct current bus.

Specifically, the monitoring of the current on the direct current bus 330 may be implemented by a circuit having a monitoring function in the direct current voltage conversion apparatus 320 shown in FIG. 3, for example, the controller 321 in the direct current voltage conversion apparatus 320 shown in FIG. 3. A circuit or controller that implements the monitoring function may have a communication interface with the direct current bus 330, to monitor the current on the direct current bus.

When it is detected that the diode is cut off, step S620 may be performed to control an output voltage of a direct current voltage conversion circuit, so that a voltage difference between two terminals of the diode is greater than a conduction threshold.

When the diode 340 is in a conducted state, for example, when it is detected that the diode 340 is not cut off or step S620 is performed so that the diode 340 is not cut off, step S630 may be performed to monitor a current voltage on the direct current bus 330.

It should be understood that a circuit or unit for monitoring the voltage on the direct current bus 330 may be the same as or different from the circuit or unit for monitoring the current. This is not limited in this embodiment of this application.

In this way, the diode 340 can be kept in the conducted state, so that whether high voltage ride-through occurs in the power supply system can be determined based on the voltage on the direct current bus, to quickly implement detection of high voltage ride-through while implementing fault isolation, and improve efficiency of detecting high voltage ride-through.

S640: Determine, based on the voltage on the direct current bus, whether high voltage ride-through occurs.

Specifically, whether high voltage ride-through occurs may be determined based on whether the voltage on the direct current bus 330 is greater than or equal to a first direct current bus voltage, where the first direct current bus voltage is greater than a rated alternating current line voltage peak of an inverter, for example, the first direct current bus voltage may be set to 1.1 times the rated alternating current line voltage peak of the inverter. When it is determined that the voltage on the direct current bus 330 is less than the first direct current bus voltage, it is determined that no high voltage ride-through occurs, and step S630 is repeatedly performed to monitor the current voltage on the direct current bus 330. When it is determined whether the voltage on the direct current bus 330 is greater than or equal to the first direct current bus voltage, it is determined that high voltage ride-through occurs, and step S650 continues.

S650: Control output power of the direct current voltage conversion circuit to be first power.

A deviation between the first power and output power of the direct current voltage conversion circuit 322 before high voltage ride-through occurs in the power supply system 300 is less than a first power deviation threshold. As an example rather than a limitation, the first power may be output power of the direct current voltage conversion circuit 322 40 ms before the controller 321 detects high voltage ride-through, and the first power deviation threshold may be a preset value, for example, 10% of rated output power. That is, the controller 321 may adjust, by controlling the output voltage and/or an output current of the direct current voltage conversion circuit 322, the output power of the direct current voltage conversion circuit 322 to the output power 40 ms before high voltage ride-through is detected, where the deviation value may be 10% of the output power.

This avoids a problem that active power imbalance may exist in the alternating current power grid during high voltage ride-through, can meet a technical requirement that active power output during a power grid fault is unchanged from active power output before the power grid fault, and improve stability of the alternating current power grid.

According to this embodiment of this application, the direct current voltage conversion apparatus controls the output voltage of the direct current voltage conversion circuit, so that the diode is in the conducted state. In this way, the direct current voltage conversion apparatus can determine, based on the voltage on the direct current bus, whether high voltage ride-through occurs, quickly implement detection of high voltage ride-through while implementing fault isolation, and improve efficiency of detecting high voltage ride-through.

Figure 7:
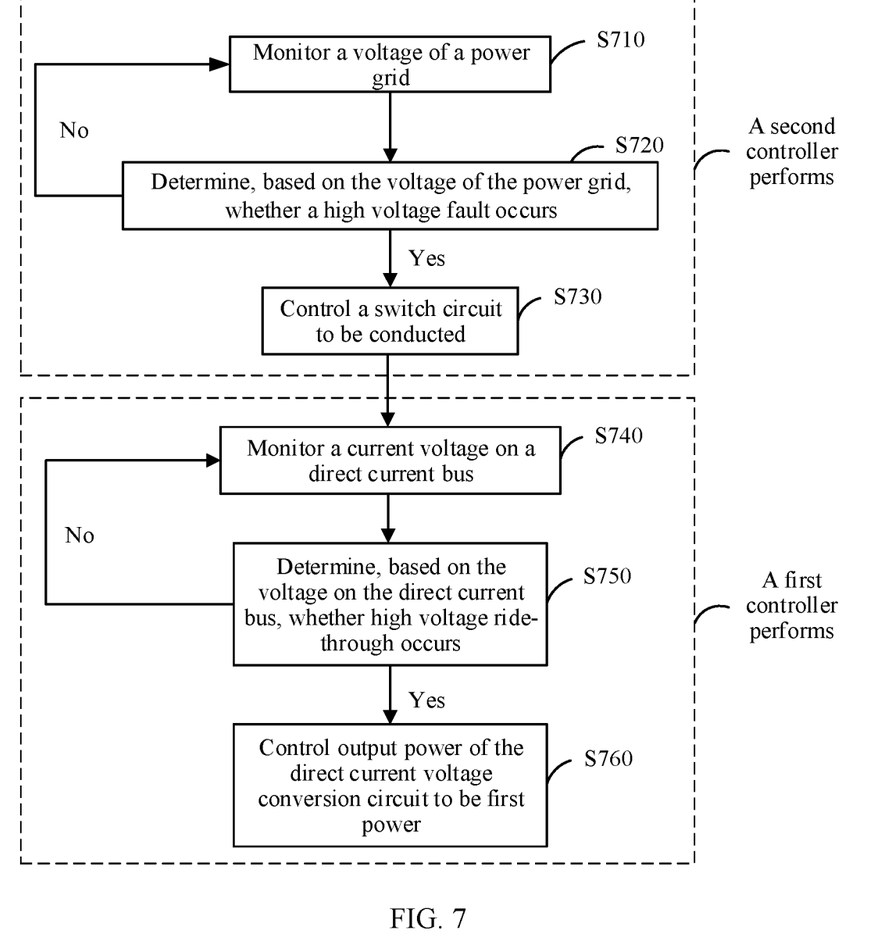
FIG. 7 is another schematic diagram of a control method for a power supply system according to an embodiment of this application.

FIG. 7 is another schematic diagram of a control method for a power supply system according to an embodiment of this application. The control method may be performed in cooperation by the first controller 421 and the second controller 451 in the power supply system 400 shown in FIG. 4. Steps S710, S720, and S730 are performed by the second controller 451 located in the inverter 450, and steps S740, S750, and S760 are performed by the first controller 421 located in the direct current voltage conversion apparatus 420.

S710: Monitor a voltage of a power grid.

Specifically, the monitoring of the voltage of the power grid 460 may be implemented by a circuit having a monitoring function in the inverter 450 shown in FIG. 4, for example, the second controller 451 located in the inverter 450 shown in FIG. 4. A circuit or controller implementing the monitoring function may have a communication interface with the power grid 460, to monitor the voltage of the power grid.

S720: Determine, based on the voltage of the power grid, whether a high voltage fault occurs.

It should be understood that, how the second controller 451 specifically determines that a high voltage fault occurs in the power grid 460 may be set based on an actual situation, or refer to the conventional technology. This is not limited in this application. For example, if the voltage of the power grid is greater than a preset voltage threshold and reaches specified time (for example, 2 ms), it is determined that a high voltage fault occurs in the power grid.

When it is determined that no high voltage fault occurs, the operation of step S710 is repeated to monitor the voltage of the power grid 460. When it is determined that a high voltage fault occurs, step S730 is performed to control a first circuit to be conducted.

In this embodiment of this application, the first circuit may be a reverse prevention insulated gate bipolar transistor (IGBT), or may be another circuit that can make a conduction current less than a preset first current value. The first current value may prevent a component in the system from being destroyed due to an excessively large current when the first circuit 470 is conducted. The first current value may be determined according to practice, and as an example, the first current value is less than a rated current value of the power supply system.

According to the conventional technology, when detecting that a high voltage fault occurs in the power grid 460, the second controller 451 in the inverter 450 increases the voltage on the direct current bus 430 to the first direct current bus voltage, where the first direct current bus voltage is greater than a peak voltage of the power grid. When a voltage on a direct current bus on the inverter 450 side is greater than a voltage on a direct current bus on the direct current voltage conversion apparatus 420 side, the direct current voltage conversion circuit 422 receives electric energy. The diode 440 connected in series to the direct current bus 430 is quickly cut off because a voltage difference between a positive electrode and a negative electrode is less than a threshold voltage, so that the current on the direct current bus 430 is cut off. In this case, the second controller 451 may quickly control the first circuit 470 to be conducted, and a current of the first circuit 470 when the first circuit 470 is conducted is less than the preset first current value.

In this case, the first controller 421 may perform step S740 to monitor the current voltage on the direct current bus.

Specifically, the monitoring of the voltage on the direct current bus 430 may be implemented by a circuit having a monitoring function in the direct current voltage conversion apparatus 420 shown in FIG. 4, for example, the first controller 421 in the direct current voltage conversion apparatus 420 shown in FIG. 4. A circuit or controller that implements the monitoring function may have a communication interface with the direct current bus 430, to monitor the voltage on the direct current bus.

S750: Determine, based on the voltage on the direct current bus, whether high voltage ride-through occurs.

Specifically, whether high voltage ride-through occurs may be determined based on whether the voltage on the direct current bus 430 is greater than or equal to the first direct current bus voltage, where the first direct current bus voltage is greater than a rated alternating current line voltage peak of the inverter. When it is determined that the voltage on the direct current bus 430 is less than the first direct current bus voltage, it is determined that no high voltage ride-through occurs, and step S730 is repeatedly performed to monitor the current voltage on the direct current bus 430. When it is determined whether the voltage on the direct current bus 430 is greater than or equal to the first direct current bus voltage, it is determined that high voltage ride-through occurs, and step S760 continues.

S760: Control output power of the direct current voltage conversion circuit to be first power.

A deviation between the first power and output power of the direct current voltage conversion circuit 422 before high voltage ride-through occurs in the power supply system 400 is less than a first power deviation threshold. As an example rather than a limitation, the first power may be output power of the direct current voltage conversion circuit 422 40 ms before the first controller 421 detects high voltage ride-through, and the first power deviation threshold may be a preset value, for example, 10% of rated output power. That is, the first controller 421 may adjust, by controlling the output voltage and/or an output current of the direct current voltage conversion circuit 422, the output power of the direct current voltage conversion circuit 422 to the output power 40 ms before high voltage ride-through is detected, where the deviation value may be 10% of the output power.

This avoids a problem that active power imbalance may exist in the alternating current power grid during high voltage ride-through, can meet a technical requirement that active power output during a power grid fault is unchanged from active power output before the power grid fault, and improve stability of the alternating current power grid.

According to this embodiment of this application, the inverter controls the first circuit to be conducted when a high voltage fault occurs in the power grid and to be turned off when no high voltage fault occurs, so that the direct current voltage conversion apparatus can determine, based on the voltage on the direct current bus, whether high voltage ride-through occurs in the power supply system, to quickly implement detection of high voltage ride-through while implementing fault isolation, and improve efficiency of detecting high voltage ride-through.

Figure 8:
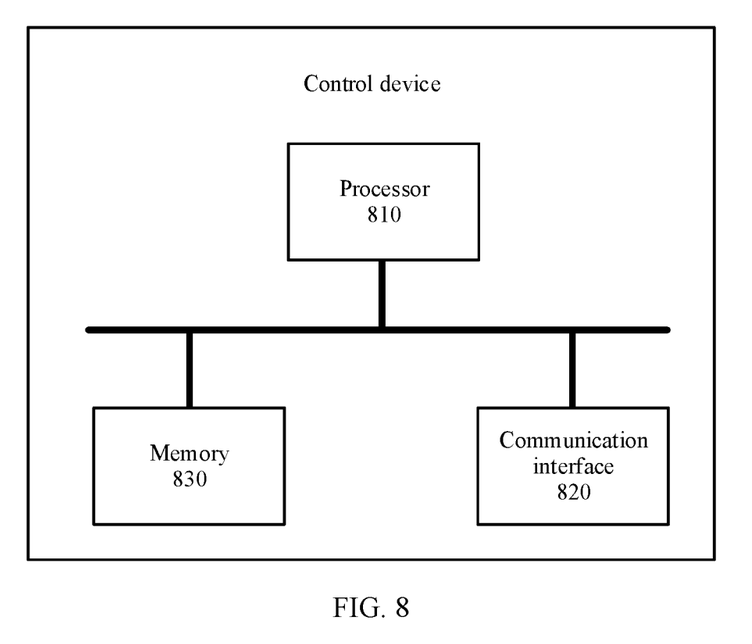
FIG. 8 is a schematic diagram of a structure of a control device according to an embodiment of this application.

FIG. 8 is a schematic diagram of a structure of a control device according to an embodiment of this application. The control device includes a processor 810 and a communication interface 820. Optionally, the control device may further include a memory 830. Optionally, the memory 830 may be included in the processor 810. The processor 810, the communication interface 820, and the memory 830 communicate with each other through an internal connection path. The memory 830 is configured to store instructions. The processor 810 is configured to execute the instructions stored in the memory 830, to implement the control method provided in embodiments of this application.

Optionally, the control device may be configured to perform functions of the controller 321 in FIG. 3 or the first controller 421 and the second controller 451 in FIG. 4.

Optionally, the control device may be further configured to perform the control method shown in FIG. 6 or FIG. 7.

Terms such as "component", "module", and "system" used in this specification are used to indicate computer-related entities, hardware, firmware, combinations of hardware and software, software, or software being executed. For example, the component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed on various computer-readable media that store various data structures. The components may communicate with each other by using a local and/or remote process and based on, for example, a signal having one or more data packets (for example, data from two components interacting with another component in a local system, a distributed system, and/or across a network such as the internet interacting with another system by using a signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of respective technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, the apparatus, and the method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve objectives of respective solutions.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this application may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely example implementations of this application, but are not intended to limit the protection scope of this application. Any variation or replacement readily figured out by a person skilled in the art within the technical scope disclosed in this application may fall within the protection scope of this application.

What is claimed is:

1. A power supply system, comprising:
    a direct current voltage conversion apparatus;
    an inverter; and
    a diode;
    wherein the direct current voltage conversion apparatus comprises a controller and a direct current voltage conversion circuit, wherein the controller is configured to control the direct current voltage conversion circuit to receive electric energy from a power generation module, perform direct current conversion, and output a voltage to the inverter through a direct current bus after performing direct current conversion;
    wherein the inverter is configured to receive the output voltage of the direct current voltage conversion circuit through the direct current bus, convert direct current power into alternating current power, and supply power to a power grid after converting the direct current power into the alternating current power;
    wherein the diode is connected in series to the direct current bus, wherein the diode is turned on based on the direct current voltage conversion circuit outputting electric energy, and is cut off based on the direct current voltage conversion circuit receiving electric energy;
    wherein the controller is further configured to:
        control the output voltage of the direct current voltage conversion circuit such that the diode is turned on; and
        detect, based on the voltage on the direct current bus, whether high voltage ride-through occurs in the power supply system.

2. The system according to claim 1, wherein the controller is further configured to:
    detect, based on a current on the direct current bus, whether the diode is cut off; and
    control the output voltage of the direct current voltage conversion circuit based on the diode being cut off such that a voltage difference between two terminals of the diode is greater than a conduction threshold of the diode.

3. The system according to claim 2, wherein the controller is further configured to:
    determine that high voltage ride-through occurs in the power supply system based on the voltage on the direct current bus being greater than or equal to a first direct current bus voltage, wherein the first direct current bus voltage is greater than a rated alternating current line voltage peak of the inverter.

4. The system according to claim 1, wherein the controller is further configured to:
    control output power of the direct current voltage conversion circuit to be first power based on high voltage ride-through occurring in the power supply system, wherein a deviation between the first power and output power of the direct current voltage conversion circuit before high voltage ride-through occurs in the power supply system is less than a first power deviation threshold.

5. The system according to claim 4, wherein the controller is further configured to:
control the output voltage and/or an output current of the direct current voltage conversion circuit based on high voltage ride-through occurring in the power supply system such that the output power of the direct current voltage conversion circuit is the first power.

6. A power supply system, comprising:
a direct current voltage conversion apparatus;
an inverter;
a diode; and
a first circuit;
wherein the direct current voltage conversion apparatus comprises a first controller and a direct current voltage conversion circuit, wherein the first controller is configured to control the direct current voltage conversion circuit to receive electric energy from a power generation module, perform direct current conversion, and output a voltage to the inverter through a direct current bus after performing direct current conversion;
wherein the inverter comprises a second controller and an inverter circuit, wherein the second controller is configured to control the inverter circuit to receive the output voltage of the direct current voltage conversion circuit through the direct current bus, convert direct current power into alternating current power, and supply power to a power grid after converting the direct current power into the alternating current power;
wherein the diode is connected in series to the direct current bus, wherein the diode is turned on based on the direct current voltage conversion circuit outputting electric energy, and is cut off based on the direct current voltage conversion circuit receiving electric energy;
wherein the first circuit is connected in parallel to the diode, and a current of the first circuit while the first circuit is turned on is less than a preset first current value;
wherein the second controller is further configured to control the first circuit to be turned on based on a high voltage fault occurring in the power grid, and control the first circuit to be turned off based on no high voltage fault occurring in the power grid; and
wherein the first controller is further configured to detect, based on the voltage on the direct current bus, whether high voltage ride-through occurs in the power supply system.

7. The system according to claim 6, wherein the first controller is further configured to:
determine that high voltage ride-through occurs in the power supply system based on the voltage on the direct current bus being greater than or equal to a first direct current bus voltage, wherein the first direct current bus voltage is greater than a rated alternating current line voltage peak of the inverter.

8. The system according to claim 6, wherein the first controller is further configured to:
control output power of the direct current voltage conversion circuit to be first power based on high voltage ride-through occurring in the power supply system, wherein a deviation between the first power and output power of the direct current voltage conversion circuit before high voltage ride-through occurs in the power supply system is less than a first power deviation threshold.

9. The system according to claim 8, wherein the first controller is further configured to:
control the output voltage and/or an output current of the direct current voltage conversion circuit based on high voltage ride-through occurring in the power supply system such that the output power of the direct current voltage conversion circuit is the first power.

10. The system according to claim 6, wherein the first circuit comprises a reverse prevention insulated gate bipolar transistor (IGBT).

11. A method for controlling a power supply system, comprising:
controlling, by a controller of a direct current voltage apparatus of the power supply system, an output voltage of a direct current voltage conversion circuit of the direct current voltage apparatus such that a diode of the power supply system is turned on, wherein the diode is connected in series to a direct current bus; and
detecting, by the controller, based on a voltage on the direct current bus, whether high voltage ride-through occurs in the power supply system, wherein an inverter of the power supply system receives the output voltage of the direct current voltage conversion circuit through the direct current bus.

12. The method according to claim 11, further comprising:
controlling, by the controller, the output voltage of the direct current voltage conversion circuit based on the diode being cut off such that a voltage difference between two terminals of the diode is greater than a conduction threshold of the diode.

13. The method according to claim 11, wherein detecting whether high voltage ride-through occurs in the power supply system comprises:
determining, by the controller, that high voltage ride-through occurs in the power supply system based on the voltage on the direct current bus being greater than or equal to a first direct current bus voltage, wherein the first direct current bus voltage is greater than a rated alternating current line voltage peak of the inverter.

14. The method according to claim 11, further comprising:
controlling, by the controller, output power of the direct current voltage conversion circuit to be first power based on high voltage ride-through occurring in the power supply system, wherein a deviation between the first power and output power of the direct current voltage conversion circuit before high voltage ride-through occurs in the power supply system is less than a first power deviation threshold.

15. The method according to claim 14, wherein controlling the output power of the direct current voltage conversion circuit to be the first power based on high voltage ride-through occurring in the power supply system comprises:
controlling, by the controller, the output voltage and/or an output current of the direct current voltage conversion circuit based on high voltage ride-through occurring in the power supply system such that the output power of the direct current voltage conversion circuit is the first power.

* * * * *